Sept. 29, 1925.
J. HANSEN
1,555,369
SAW HANDLE
Filed Feb. 26, 1924
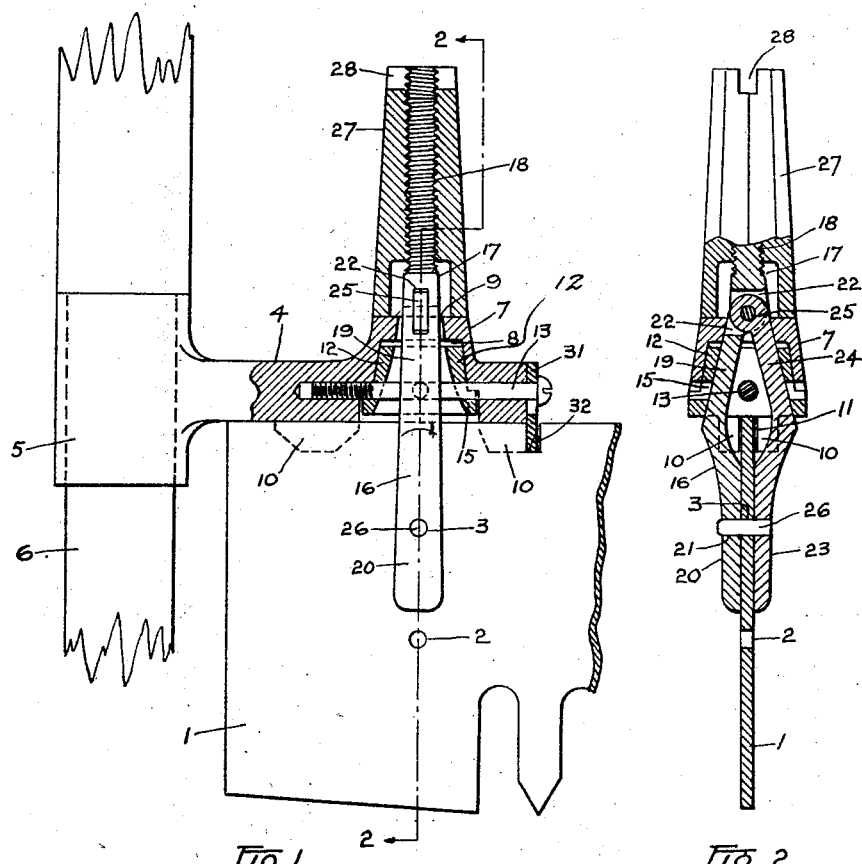
INVENTOR
JOHAN HANSEN.
BY
ATTORNEYS Patented Sept. 29, 1925.

1,555,369

UNITED STATES PATENT OFFICE.

JOHAN HANSEN, OF VANCOUVER, BRITISH COLUMBIA, CANADA.

SAW HANDLE.

Application filed February 26, 1924. Serial No. 695,302.

*To all whom it may concern:*

Be it known that I, JOHAN HANSEN, a subject of the King of Norway, and a resident of the city of Vancouver, in the Province of British Columbia, Canada, have invented certain new and useful Improvements in Saw Handles, of which the following is a specification.

My invention relates to improvements in saw handles, the objects of which are to provide means whereby the saw is rigidly secured to the handle in such a manner that no slackening of the grip can take place during the use of the saw, and in which such fastening means is made to suit saws having differently spaced bolt apertures, a further object being to provide for suitable fastening means between the handle and the saw which will leave the entire cutting length of the saw unobstructed, and which consists essentially of a handle to which wedge shaped gripping tongues designed to engage the saw handle, and a dog adapted to engage a slot in the back of the saw blade are attached, as will be more fully described in the following specifications:—

Fig. 1 is a part longitudinal sectional view of my invention.

Fig. 2 is a transverse section taken on the line 2—2 of Fig. 1.

Fig. 3 is a plan view of the handle body (looking up).

In the drawings like characters of reference indicate corresponding parts in each figure.

The numeral 1 indicates a section of a saw blade having adjacent its end, bolt apertures 2 and 3. 4 indicates generally the handle body terminating at one end in a circular collar 5 which is adapted to receive a wooden hand grip 6. 7 is an enlargement intermediately of the length of the body 4, in the underside of which is formed a conical recess 8, 9 is an aperture through the enlargement 7 concentric with the recess 8.

The numeral 10 indicates a plurality of projections (shown in Fig. 1 in dotted line) which extend downwards from the underside of the body 4 and on both sides of the saw blade 1 to form grooves 11 (see Fig. 2) to hold the back of the saw in line with the handle body.

The numeral 12 indicates generally a conical wedge collar which is held in the recess 8 by a bolt 13 passing longitudinally into the body from the outer end thereof, the collar 12 is provided with two pairs of diametrically opposed and tangentially disposed grooves 14 extending upwards therein, one pair being set further apart than the other, the purpose of which will hereinafter appear. 15 indicates a plurality of apertures passing through the collar 12 by which it is held in desired position in the body 4 by the bolt 13. The numeral 16 indicates generally the saw gripping tongues which are formed with a vertically disposed shaft 17 threaded at its upper end as at 18, the lower portion of which is shaped to provide an offset portion 19 and a substantially half round gripping portion 20 in which an aperture 21 is bored. Adjacent the base of the thread 18 the shaft 17 is morticed as at 22. 23 is a further gripping portion to correspond and co-act with the gripping portion 20, the upper portion thereof being inwardly offset as at 24 and terminating at its upper extremity in a hinge barrel 25 fulcrumed in the mortice 22. 26 is a pin secured to the gripping portion 23 to engage one of the apertures 2 or 3 of the saw blade and to register with the aperture 21 of the gripping portion 20.

The numeral 27 indicates an elongated nut on the shaft 18 which is preferably tapered that a wrench may be quickly fitted thereto without adjustment and that an effective turning movement may also be imparted to it by hand, the nut is also provided with a slot 28 in its upper end by which it may be conveniently tightened upon the shaft with any suitable flat instrument. The outer extremity of the handle body 4 is provided with a pair of vertical projections 29 forming between them a groove 30 in which is slidably positioned a slotted dog 31 secured to the body by the bolt 13 by which a notch 32 in the back of the saw blade 1 is engaged to prevent endwise movement of the blade with respect to the handle body.

Having thus described the several parts of my invention I will now briefly explain the manner in which it is attached to a saw blade.

The nut 27 is slackened lowering the shaft 17 and permitting the offset portions 19 and 24 to engage the bolt 13 thus spreading them and the gripping portions 20 and 23 apart, when a saw blade may be placed therebetween and engaged by the pin 26. On the nut 27 being tightened upon the shaft 17 the offset portions of the gripping tongues contact with opposing grooves in the wedge collar 12 bringing the gripping portions 20 and 23 into forceful contact with the sides of the saw blade, while simultaneously engaging the back of the blade with the grooves 11. The dog 31 is set into the notch 32 of the blade and fixed in position by the bolt 13 when the saw is ready for use.

Should it be desired to connect the handle with a saw having an aperture in a position indicated by aperture 2 in Fig. 1, in order to obtain a suitable grip of the blade it would be necessary to withdraw the bolt 13 from the handle body and set the wedge collar 12 at a right angle to the position shown, so that the offset portions of the gripping tongues would engage the more sharply inclined pair of grooves in the collar and that the tongues would reach their ultimate grip at a greater distance from the handle body.

It will thus be seen that I have invented a simple handle to which saw blades having differently positioned fastening apertures may be rigidly secured and that movement of the blade with respect to the handle is eliminated.

What I claim as my invention is:

1. In a saw, the combination of a handle including a turnably mounted collar, a gripping device encircled by said collar and movable therethrough, said gripping device comprising a pair of laterally movable jaws adapted to engage opposite sides of a saw blade and a pin carried by one jaw adapted to be engaged in a selected one of several openings formed in the saw blade, means for moving the gripping device through the collar in a direction to bring one edge of the saw blade against the handle means and coacting means carried by the collar and the jaws of the gripping device and acting during the aforesaid movement of the gripping device to automatically clamp the jaws firmly against opposite sides of the saw blade, said last mentioned means including provision for regulating the extent to which the gripping device must be moved through the collar in order to clamp the jaws against the blade as aforesaid.

2. A device of the character described comprising handle means including a turnably mounted collar formed with internal grooves arranged in pairs differing in angular set, a gripping device movable axially through said collar and including a pair of connected relatively movable jaws engageable with opposite sides of a saw blade and a pin carried by one of said jaws adapted to enter an opening in the saw blade, said jaws being formed with portions engageable with the grooves of one of said pairs to automatically force the jaws into clamping engagement with an interposed saw blade upon movement of the gripping device in one direction, said collar being adjustable to selectively present either pair of grooves for engagement with the jaws so as to regulate the degree to which the gripping device must be moved relatively to said collar in order to clamp the jaws against the blade, and means for moving the gripping device as required.

Dated at Vancouver, B. C., this 14th day of February, 1924.

JOHAN HANSEN.